United States Patent [19]

Fowler et al.

[11] 3,710,269

[45] Jan. 9, 1973

[54] SEMICONDUCTOR DEVICES

[75] Inventors: Eliot Patrick Fowler; Richard William Greaves, both of Dorset, England

[73] Assignee: United Kingdom Atomic Energy Authority, London, England

[22] Filed: Feb. 16, 1971

[21] Appl. No.: 115,654

[30] Foreign Application Priority Data

Feb. 13, 1970 United Kingdom ......................7161

[52] U.S. Cl. ..................330/16, 307/299, 317/235 Z, 330/28;38 M

[51] Int. Cl. ............................H03f 3/04, H01l 11/00

[58] Field of Search .......307/299; 317/235 Y, 235 Z; 330/16, 38 M

[56] References Cited

UNITED STATES PATENTS

| | | | |
|---|---|---|---|
| 2,854,588 | 9/1958 | Landauer | 307/299 |
| 2,859,286 | 11/1958 | Kennedy | 317/235 |
| 2,882,463 | 4/1959 | Dickinson | 307/299 X |
| 3,579,059 | 5/1971 | Widlar | 317/235 R |

*Primary Examiner*—Roy Lake
*Assistant Examiner*—Lawrence J. Dahl
*Attorney*—Larson, Taylor & Hinds

[57] ABSTRACT

A semi-conductor device embodying the invention is in the form of a lateral transistor and has a substrate of n-type material carrying a base electrode, and diffused-in regions of p-type material one of which carries an emitter electrode and two others of which each carry respective collector electrodes. The collector electrodes are at different distances from the emitter electrode and have substantially different current gains. The device is thus useful as a current amplifier or, in reverse, as a current attenuator.

5 Claims, 4 Drawing Figures

SEMICONDUCTOR DEVICES

The invention relates to semi-conductor devices and to electrical circuit arrangements incorporating such devices.

According to the invention, there is provided a semiconductor junction device, having an emitter electrode, a base electrode and at least two collector electrodes mounted at different distances from the emitter electrode and capable of simultaneously providing different current gains in response to a given base-emitter voltage.

Semi-conductor devices embodying the invention will now be described, by way of example only, with reference to the accompanying diagrammatic drawings in which.

Figure 1:
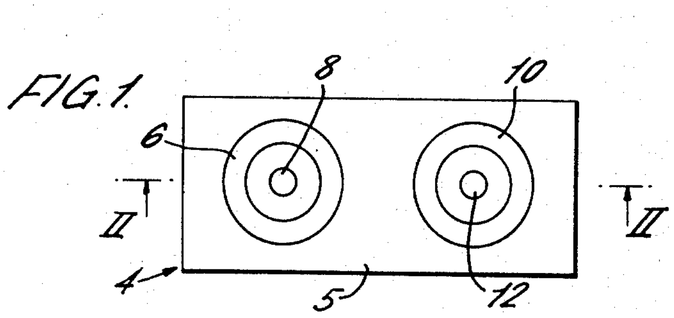
FIG. 1 is a plan view of one of the devices.

The device 4 comprises a substrate 5 (n-type in this example) having regions 6, 8, 10 and 12 of p-type material diffused in. As shown in FIG. 1, the regions 6 and 10 are in the form of rings surrounding the regions 8 and 12 which are of dot or spot configuration. In one particular example of the device, the center dots 8 and 12 have diameters of 20 $\mu$m, and the rings 6 and 10 have inner diameters of 40 $\mu$m and outer diameters of 80 $\mu$m.

Electrodes 16, 18, 20 and 22 are respectively attached to the substrate 5 and to the p-type regions 12, 6 and 10. In use, the device functions in the manner of a transistor with electrode 16 functioning as a base electrode, electrode 18 functioning as an emitter electrode, and electrodes 20 and 22 functioning as respective collector electrodes: it will be noted that the collector 20 is further from the emitter 18 than the collector 22.

If $I_e$ is the current in emitter 18, $I_{cr}$ is the collector current in collector 20 and $I_{cn}$ is the collector current in collector 22, then $$I_{cr}/I_e = \alpha_1 \text{ and}$$

$$I_{cn}/I_e = \alpha_2.$$

Therefore, $$I_{cr}/I_{cn} = \alpha_1/\alpha_2 \quad (1)$$

The geometrical spacing between the emitter 18 and the collector 22 is small and approximates to that in a conventional transistor. $\alpha_2$ therefore has a value close to unity. The second collector 20 is, however, geometrically spaced a comparatively large distance from the emitter 18, and it is found that $\alpha_1$ is very much smaller and may, for example, be between 0.001 and 0.0001. Thus, from Equation 1, it will be seen that the current in the collector 22 could be as much as $10^4$ times the current in the collector 20 for a given value of base-emitter voltage. The device is thus useful as a current amplifier, or, in reverse, as an attenuator. The linearity of the relationship between the two currents $I_{cr}$ and $I_{cn}$ depends on the manner in which $\alpha_1$ and $\alpha_2$ change with changing base-emitter voltage, but a linear relationship between $I_{cr}$ and $I_{cn}$ can be obtained over several decades of current. It should also be noted that, although both $I_{cr}$ and $I_{cn}$ will change with temperature, their ratio will remain substantially unaffected by temperature.

The collector and emitter electrodes can be arranged differently from the manner shown in FIG. 1. Thus, for example, one of the p-type ring regions 6, 10 could be made the emitter, with the center dot region within that ring as one of the collectors and either the other ring region or its center dot region as the second collector. It may be preferable to use the center dot regions 8 and 12 as the collectors in order to minimize collector leakage current. The value of $\alpha_1/\alpha_2$ depends on the particular regions selected for the collector and emitter electrodes.

Although the device illustrated has only two collectors, one or more additional collectors may be added, the current gain of each additional collector being inversely dependent on its distance from the emitter in the manner explained above.

Although, in the device illustrated in the FIGS., the diffused-in regions have been shown as rings each with a central spot, this type of configuration is not essential. For example, a single central spot region could be surrounded by more than one ring region. In such a case, the central spot could form the emitter electrode, and the outer rings could form respective collector electrodes. Instead the ring configurations could be dispensed with altogether.

Figure 2:
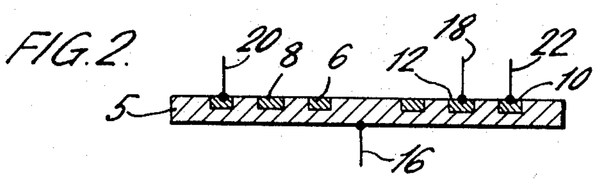
FIG. 2 is a cross-section on the line II—II of FIG. 1.

The device of FIGS. 1 and 2 may, for example be constructed by modifying a lateral transistor to add an additional one or more collector electrodes.

Figure 3:
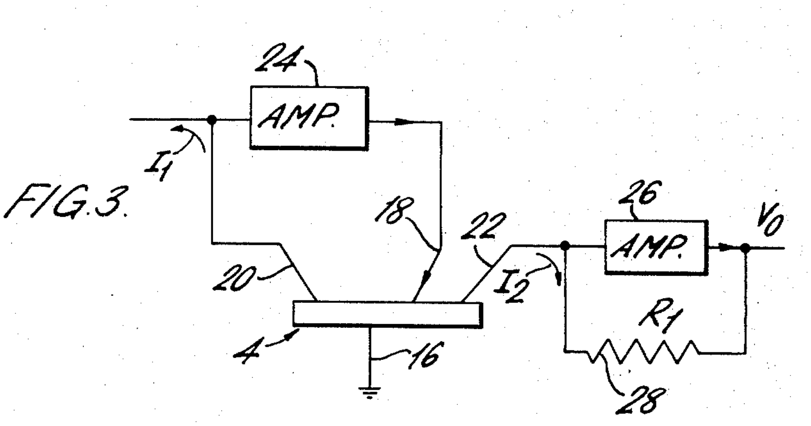
FIGS. 3 and 4 show circuit arrangements incorporating the device of FIGS. 1 and 2.

FIG. 3 shows how the device of FIGS. 1 and 2 may be used in the measurement of very low currents, and items in FIG. 3 corresponding to those in, FIGS. 1 and 2 are similarly referenced.

In FIG. 3, a low current $I_1$, to be measured is applied to the collector 20 (that is, the collector relatively remote from the emitter) of the device 4, and an amplifier 24 is connected between the collector 20 and the emitter 18 of the device to supply the base-emitter voltage. The collector 22 (that is, the collector relatively near to the emitter) is connected to a second, operational, amplifier 26 having a feedback resistor 28.

The amplifier 24 is an electrometer-type operational amplifier which ensures that all current $I_1$ to be measured flows in the collector electrode 20. The negative gain of the amplifier is sufficiently high to ensure that $I_1 = I_{cr}$.

From Equation 1 above, and assuming that the output voltage at terminal 29 is $V_O$ and the resistance of the resistor 28 is $R_1$, then $$I_1 = \alpha_1/\alpha_2 \cdot V_0/R_1 \quad (2)$$

Thus, if the ratio of $\alpha_1$ to $\alpha_2$ is, say, 0.0001, then the resistance $R_1$ of the resistor 28 can be smaller, by a factor of $10^4$, than it could be if the device 4 and amplifier 24 were omitted. The circuit arrangement thus enables very low current to be measured with comparatively low value and inexpensive resistors. If, for example, the lowest current to be measured were $10^{-14}$ amps., then $R_1$ will be of the order of $10^{10}$ ohms (for $V_o$= 1 volt and $\alpha_1/\alpha_2$=0.0001) instead of $10^{14}$ ohms without the device 4.

Figure 4:
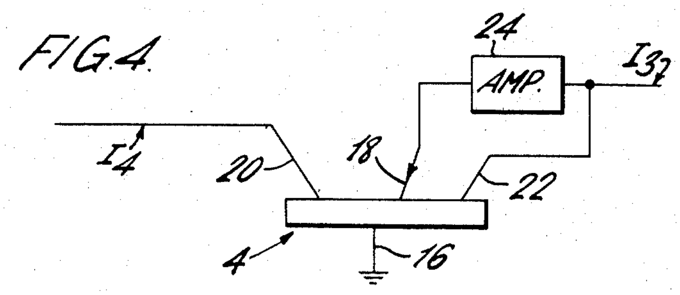

FIG. 4 shows how the device 4 can be used to generate a very low known current $I_4$ at high impedance, and items in FIG. 4 corresponding to items in the other FIGS. are similarly referenced. Here, a known current $I_3$ is fed into the collector 22 (the relatively near collector), and the electrometer-type amplifier 24 is connected between this collector and the emitter 18 of the device. The current $I_4(=I_{cr})$ from collector 20 (the more remote of the two collectors) is thus given by $$I_{cr}=\alpha_1/\alpha_2 \cdot I_3$$

The output current $I_{cr}$ can thus be smaller, by a factor of $10^4$, than the input current $I_3$.

We claim:

1. A low-current circuit arrangement comprising, in combination, a semi-conductor junction device, having a body providing regions of different conductivity type material, an emitter electrode on one of the body regions, a base electrode on another of the body regions, and at least two collector electrodes on respective further ones of the body regions, the collector electrodes being at different distances from the emitter electrode and simultaneously providing different current gains in response to a given base-emitter voltage, amplifying means having an input and an output and a high input impedance, and means connecting the input and output of the amplifying means to, respectively, a first one of the collector electrodes of the device and the emitter electrode of the device, so that the path between the emitter electrode and the said first one of the collector electrodes forms a negative feedback loop of the amplifying means.

2. A circuit arrangement according to claim 1, in which the body comprises a substrate of semi-conductor material of one and conductivity type and carrying the base electrode, material of the opposite conductivity type diffused into the substrate at a plurality of discrete locations one of which is in the form of a ring and the other in the form of a spot centered within the ring, one of the spot and ring locations carrying the emitter electrode and the other thereof carrying one of the collector electrodes.

3. A Circuit arrangement according to claim 2, in which a further two of the said plurality of discrete locations are respectively in the form of a further ring and a further spot centered therewithin, one of the further two locations carrying a further one of the said collector electrodes.

4. A circuit arrangement according to claim 1, including second amplifying means having a high input impedance and impedance means providing a negative feedback loop therefor, and means connecting the second amplifying means to be fed from a second one of the collector electrodes which is nearer to the emitter electrode than the first collector electrode whereby the ratio of the output voltage of the second amplifying means to the value of the impedance means is a predetermined multiple of the current in the first collector electrode.

5. A circuit arrangement according to claim 1, including means connected to drive a predetermined current through the said first collector electrode such that the current through a second one of the collector electrodes, further from the emitter electrode than the first collector electrode, is a predetermined fraction of that through the first collector electrode.

* * * * *